United States Patent [19]

Kokubo

[11] 4,072,207
[45] Feb. 7, 1978

[54] AUTOMOTIVE SPEED CONTROL DEVICE

[75] Inventor: Toshihiro Kokubo, Higashi Matsuyama, Japan

[73] Assignee: Diesel Kiki Co., Ltd., Tokyo, Japan

[21] Appl. No.: 754,452

[22] Filed: Dec. 27, 1976

Related U.S. Application Data

[63] Continuation of Ser. No. 637,667, Dec. 4, 1975, abandoned.

[30] Foreign Application Priority Data

Dec. 7, 1974 Japan .............................. 49-148994
Dec. 7, 1974 Japan .............................. 49-148995
Dec. 7, 1974 Japan .............................. 49-148996

[51] Int. Cl.² ........................................... B60K 31/00
[52] U.S. Cl. ............................ 180/108; 180/105 R; 180/109
[58] Field of Search ............ 180/105 R, 106, 108, 180/109, 110; 123/103 E, 102

[56] References Cited

U.S. PATENT DOCUMENTS

| 3,114,427 | 12/1963 | Thorner .............................. 180/109 |
| 3,171,394 | 3/1965 | Beegle ................................. 123/102 |
| 3,195,673 | 7/1965 | Cassano .............................. 180/109 |
| 3,343,423 | 9/1967 | Thorner .......................... 180/109 X |
| 3,441,104 | 4/1969 | Hagler ................................ 180/108 |
| 3,590,938 | 7/1971 | Gurol ................................. 180/108 |
| 3,721,309 | 3/1973 | Donaldson ...................... 180/105 R |

*Primary Examiner*—Joseph F. Peters, Jr.
*Assistant Examiner*—Terrance L. Siemens
*Attorney, Agent, or Firm*—Edward F. Connors

[57] ABSTRACT

In an automotive speed control device in which an accelerator pedal is held in a decelerating position by a force produced by an operating fluid pressure which is proportional to a predetermined speed setting, a relief means in the form of a spiral spring or a pressure relief valve is provided to absorb or relieve a strong depressing force exerted by a vehicle operator to the accelerator pedal. The speed control device further comprises a release means by which the operating fluid pressure is released in accordance with a release signal.

9 Claims, 5 Drawing Figures

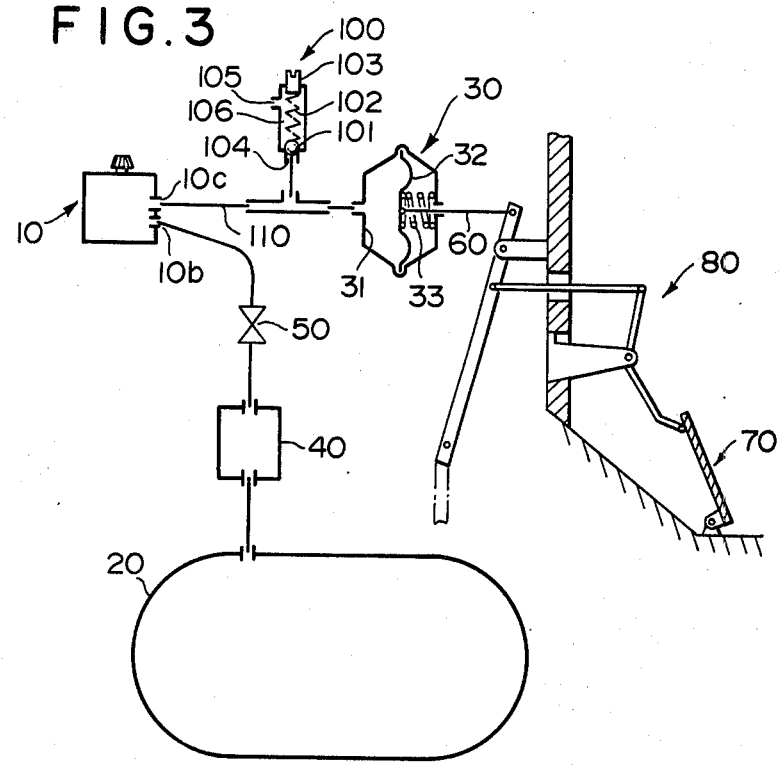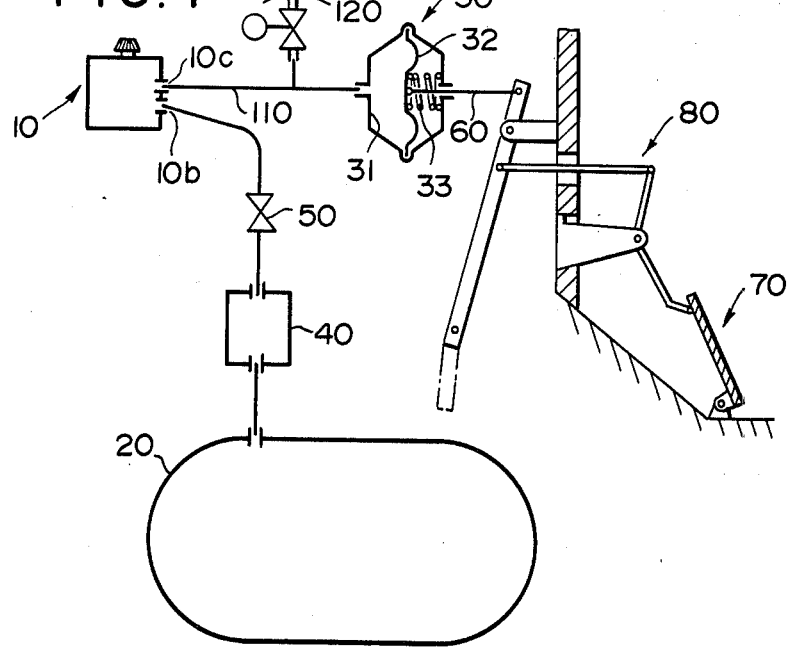

AUTOMOTIVE SPEED CONTROL DEVICE

This is a continuation, of application Ser. No. 637,667 filed Dec. 4, 1975, now abandoned.

The present invention relates generally to a speed control device for an automotive vehicle and, more particularly, to a device which is capable of limiting the maximum running speed of the vehicle to a predetermined value to prevent the vehicle from running at a speed higher than the predetermined speed.

There have been previously proposed devices of the category above which are employed in a usual automobile with an accelerator member operable by a vehicle operator to regulate the speed output of a prime mover of the automobile and therefore running speed of the vehicle. In such devices, when the vehicle speed being sensed by sensing means has risen to the predetermined maximum setting, a mechanical force produced by any mechanism in accordance with the sensed maximum speed is applied to the accelerator member to urge it to a decelerating position which provides a vehicle speed lower than the predetermined setting. Thus, the output speed of the vehicle is no longer increased independently of the operator's intention to accelerate the vehicle.

In actual practice, a rotary fluid pressure converter as known per se is employed to deliver an operating fluid pressure in accordance with the sensed maximum speed to a diaphragm-type actuating mechanism. The diaphragm of the actuator is connected to the accelerator member such as an accelerator pedal through an appropriate mechanical linkage. Upon receiving the operating fluid pressure from the fluid pressure converter, the diaphragm is moved to hold the accelerator pedal in the decelerating position.

If the vehicle operator then depresses the accelerator pedal strongly toward an accelerating position against that force holding the pedal in the decelerating position, the actuator, linkage, or other mechanism provided between the fluid pressure converter and the accelerator pedal will be badly damaged. It is therefore required to relieve at least part of the depressing force applied by the operator to the pedal while the speed control device is in an operative position to urge the pedal to the decelerating position.

Besides, the speed control device to limit the maximum vehicle speed of the type mentioned above has another defect such that acceleration in any emergency is prohibited and may rather result in a dangerous accident particularly during passing another car ahead or in an emergency car.

It is therefore a general object of the present invention to provide a device of the character above which eliminates or alleviates the aforementioned defects and problems.

Another object of the present invention is to provide, in a device of the character above, a relief means to relieve a strong depressing force exerted by a vehicle operator to the accelerator pedal against the force applied by the speed control device.

Still another object of the present invention is to provide a device of the character above which comprises means to release control operation of the speed control device in accordance with a release signal.

Other specific objects, features and advantages of the present invention will become clear from the following detailed explanation taken with the accompanying drawings, in which:

FIG. 3 is a schematic view showing another preferred embodiment of a device according to the present invention;

FIG. 4 is a schematic view showing still another preferred embodiment of a device according to the present invention.

Figure 1:
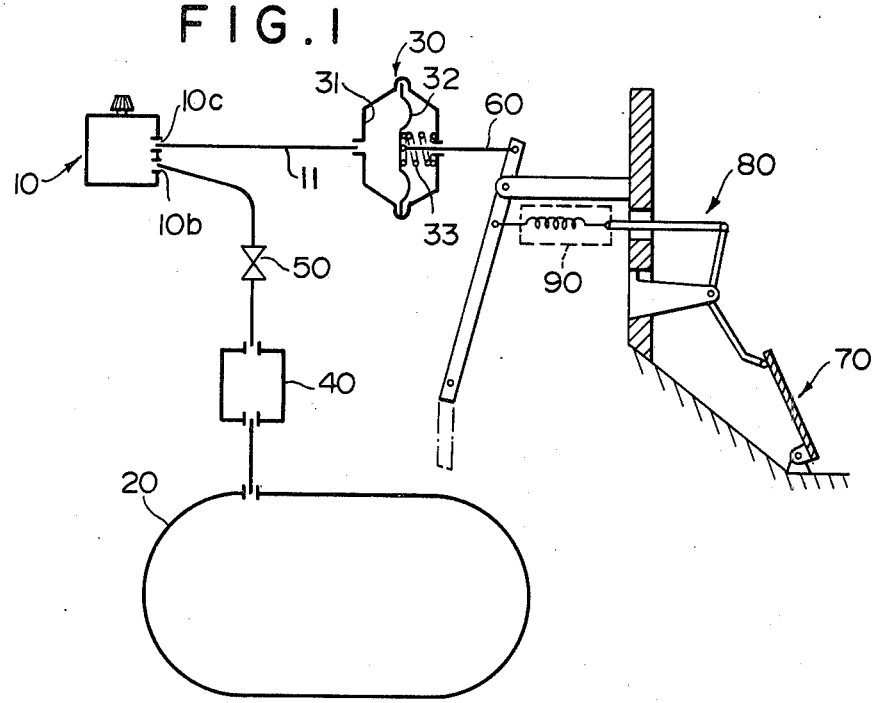
FIG. 1 is a schematic view showing a preferred emodbodiment of a device according to the present invention.

With reference to FIG. 1, a rotary fluid pressure converter 10 is responsive to a speed of an automotive vehicle measured by means such as a speedometer (not shown) and when the measured vehicle speed approximates or reaches a predetermined setting, it delivers an operating fluid pressure from a fluid pressure source 20 to an actuator 30 which will be further described.

Figure 2:
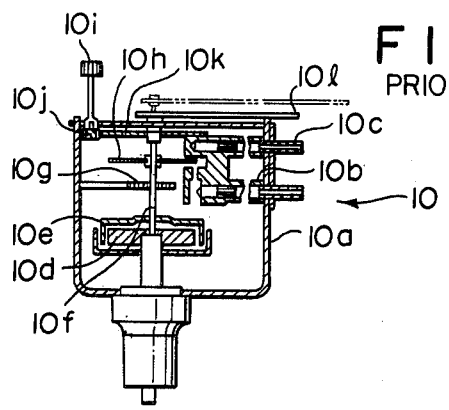
FIG. 2 is an enlarged, detailed view of part of the device shown in FIG. 1.

Although various conventional structures may be adapted for the fluid pressure converter, an exemplary one is illustrated in FIG. 2. As shown, the rotary fluid pressure converter 10 is shown to be built in a casing 10a, for example, a speedometer casing. An inlet nozzle 10b formed to the converter communicated with the fluid pressure source 20 through an air filter 40 and a pressure relief valve 50, while an outlet nozzle 10c is connected to the actuator 30. The converter 10 further comprises a rotary magnet 10d driven by a speedometer cable (not shown) and a disc plate 10e of a non-magnetic, electrically conductive material provided coaxially and in opposite to the rotary magnet 10d, said disc plate 10e being mounted on a rotary shaft 10f to receive the rotary force exerted by a spiral spring 10g. The vehicle speed is set up by turning a dial or knob 10i which rotates a gear 10j secured to the dial 10i and a nozzle moving plate 10k mounted on the rotary shaft 10f, said nozzle moving plate 10k being provided to be able to move in the radial direction. The speed thus set up may be indicated by a speed setting pointer 10, provided on the casing 10a.

In operation of such fluid pressure converter 10, a rotary force is transmitted by an electric eddy current generated proportionately to speed difference in the ratio of a magnet 10d responsive to the vehicle speed and the rotation of a non-magnetic disc plate 10e, the rotary force of which being carried by a spring force, wherein an area of flow passages between two opposite fluid nozzles is variable by displacement of the disc plate 10e so as to control the fluid pressure being applied to the actuator 30 through a fluid pressure conduit 11. The operating fluid pressure is thus transmitted to the actuator 30 through the fluid pressure conduit 11 in accordance with the measured variable speed.

The diaphragm-type actuator 30 as usual consists of a fluid pressure chamber 31 divided by a resiliently movable diaphragm member 32 into two sections, one of which communicates with the outlet nozzle 10c of the fluid pressure converter 10 through the fluid pressure conduit 11. The other of sections accomodates a preloaded diaphragm spring 33.

To the diaphragm member 32 is secured a connection rod 60 which in turn is connected to an accelerator pedal 70 by means of a linkage mechanism 80. The linkage mechanism 80 is, on the other hand, connected through a throttle lever to a throttle valve in a gasoline-powered engine or to a control lever of a governor in a diesel engine, or the like to transmit the displacement of the accelerator 70 to such member controlling the fuel delivery to the prime mover, though not shown.

According to the preferred embodiment of FIG. 1, a relief means in the form of a spiral spring 90 is provided to a linkage mechanism 80 in a manner as illustrated, such that the spring 90 is pulled tending to extend in its length when the accelerator pedal 70 is depressed by the operator. In lieu of the spiral spring 90, any resilient or elastomeric element may be employed as a relief means.

In operation of the device described, when the vehicle speed reaches the predetermined setting, the rotary fluid pressure converter 10 driven by the speedometer cable operates to transmit the operating fluid pressure to the actuator 30. The operating fluid pressure is then applied to the diaphragm 32 to displace it toward the right in the drawing. The displacement of the diaphragm 32 is transmitted through the connecting rod 60 and the linkage mechanism 80 to the accelerator pedal 70, whereby the pedal 70 is held in the decelerating position.

When the operator exerts a strong depressing force against the force holding the pedal 70 in the decelerating position, the spiral spring 90 extends and absorbs at least part of the depressing force preventing it from transferring to the linkage mechanism 80 or the actuator 30.

According to another preferred embodiment of FIG. 3, a pressure relief valve 100 is employed as a relief means instead of the spiral spring 90 in the first-mentioned embodiment. The pressure relief valve 100 is disposed in a fluid pressure conduit 110 connecting the outlet nozzle 10c of the fluid pressure converter 10 and the actuator 30 and consists of a valve member 101 of a ball type, a spiral spring 102 urging the valve ball 101 to a closed position and a spring adjusting screw 103. The valve ball 101 bears against a valve opening 104 in the valve closed position, while it is lifted from the valve opening 104 by the fluid pressure in the conduit 110 exceeding a predetermined value. The valve opening 104 then communicates with an atmosphere through an opening 105 formed to a valve casing 106 to discharge the excessive fluid pressure. The fluid pressure in the conduit 110 is thus reduced to be lower than the predetermined pressure.

When the operator depresses the accelerator pedal 70 to the accelerating position while the speed control device is operated to hold the pedal 70 in the decelerating position, the diaphragm 32 of the actuator 30 is displaced toward the left in the drawing so that the fluid pressure in the actuator 30 and in the fluid pressure conduit 110 is increased. Thereupon, the pressure relief valve 100 is moved to an open position to discharge excessive pressure until the pressure is lower than the predetermined value. Hence, too strong force to damage the actuator 30 or other mechanism is properly relieved by this arrangement.

Figure 5:
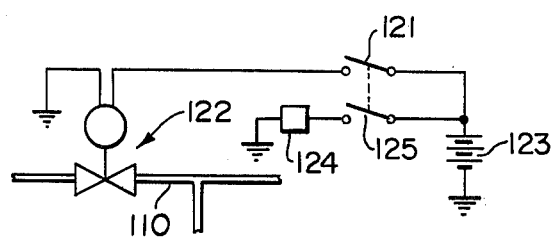
FIG. 5 is a schematic view of part of the embodiment shown in FIG. 4.

With reference to FIGS. 4 and 5, an emergency release means 120 is provided in the fluid pressure conduit 110 according to still another embodiment of the present invention. The release means 120 comprises a pressure release valve 122 disposed in the fluid pressure conduit 110, which is operable in response to a release signal produced by a release signal producing means to open and close the fluid pressure conduit 110. In the open position of the valve 122, the fluid pressure is discharged to the atmosphere like the pressure relief valve 100 in the second embodiment in FIG. 3. The release signal producing means comprises a power source such as a battery 213 and an emergency switch 121 which is closed to produce the release signal when requiring acceleration during passing another car or in an emergency. Practically, the release signal producing means is associated with an alarm 124, for example, a traffic indicator or a warning siren or whistle in an emergency car such as ambulance car, fire engine and the like. In more detail, the switch 121 of the release signal producing means is as shown in FIG. 5, cooperated with a power switch 125 of the alarm 124 which is connected between the battery 123 and the alarm 124.

In operation, the speed control device operates in a manner already described to hold the accelerator pedal 70 in the decelerating position. When however the switch 121 is closed upon closure of the switch 125 the pressure relief valve 122, assumes an open position so that most of the fluid pressure in the actuator 30 is discharged through the valve 122 to the atmosphere. Thus, the force to hold the pedal 70 in the decelerating position is no longer applied to the pedal 70, which permits the vehicle operator to freely depress the accelerator pedal 70 to the accelerating position.

This embodiment is therefore advantageous in that acceleration and high-speed running are enabled when required, preventing a dangerous accident during passing another car ahead or during emergency, whilst in usual condition, the vehicle speed is limited to the predetermined setting for sound operation of the vehicle. Of course, the emergency switch 121 is equipped in a car as on an instrument panel to be manually operable by the operator, without being connected to the traffic indicator or warning siren.

Throughout all the embodiments, a positive pneumatic pressure is shown to be employed as an operating fluid pressure, although any kind of pressure such as liquid pressure or negative air pressure may be utilized by slight modification applied to the train from the fluid pressure converter to the actuator.

What is claimed is:

1. A speed control device for an automotive vehicle having an accelerator member selectively movable by a vehicle operator between an accelerating position and a decelerating position, comprising in combination:

speed responsive means having a fluid pressure converter responsive to a vehicle speed to produce an operating fluid pressure when the vehicle speed exceeds a predetermined level;

pressure responsive means operatively connected between the speed responsive means and the accelerator member and responsive to the operating fluid pressure to apply a force of the operating fluid pressure to the acceleration member to hold the same at the decelerating position providing a speed lower than the predetermined level;

relief means operatively connected to the accelerator member to relieve a force applied to the accelerator member by the vehicle operator against the force of the operation fluid pressure applied to the same;

release signal producing means cooperated with an alarm provided in the vehicle to produce a release signal when the alarm is actuated; and, pressure release means provided between the speed responsive means and the pressure responsive means and responsive to the release signal to release the operating fluid pressure whereby the accelerator member is movable to the accelerating position.

2. A speed control device according to claim 1 in which the relief means comprises a spiral spring connected between the pressure responsive means and the accelerator member to absorb at least a part of the force applied to the accelerator member by the vehicle operator.

3. A speed control device according to claim 1 in which the relief means comprises a pressure relief valve provided between the speed responsive means and the pressure responsive means to relieve the fluid pressure in the pressure responsive means when the fluid pressure exceeds a predetermined value.

4. A speed control device according to claim 3 in which the pressure relief valve comprises a valve casing having an opening communicating with an atmosphere and a valve opening communicating with the pressure responsive means, a valve member closing the valve opening in the valve casing and a spiral spring urging the valve member to the valve opening.

5. A speed control device according to claim 4 in which the pressure relief valve further comprises a spring adjusting screw for the spiral spring.

6. A speed control device according to claim 4 in which the valve member is a ball.

7. The speed control device according to claim 1 in which the release signal producing means comprises an emergency switch which is connected to a power source and cooperated with a power switch of the alarm.

8. A speed control device according to claim 1 in which the alarm is a warning siren.

9. A speed control device according to claim 1 in which the alarm is a traffic indicator.

* * * * *